United States Patent
Satou et al.

(10) Patent No.: US 7,194,135 B2
(45) Date of Patent: Mar. 20, 2007

(54) IMAGE RECORDING DEVICE (75) Inventors: Kazuyuki Satou, Hitachinaka (JP); Takahiro Nakano, Hitachinaka (JP); Hajime Akutsu, Yokohama (JP)

(73) Assignee: Hitachi Ltd., Tokyo (JP)

( * ) Notice: Subject to any disclaimer, the term of this patent is extended or adjusted under 35 U.S.C. 154(b) by 721 days.

(21) Appl. No.: 10/305,760

(22) Filed: Nov. 27, 2002

(65) Prior Publication Data
US 2003/0138164 A1 Jul. 24, 2003

(30) Foreign Application Priority Data
Jan. 22, 2002 (JP) ............................. 2002-013107

(51) Int. Cl.
*G06K 9/36* (2006.01)
*G06K 9/46* (2006.01)

(52) U.S. Cl. ...................... 382/236; 382/252; 382/275; 382/239; 375/240

(58) Field of Classification Search ........ 382/232–233, 382/236, 245–246, 248, 250–253, 275; 348/607, 348/452, 400.1; 375/240.26, 240.27, 240
See application file for complete search history.

(56) References Cited

U.S. PATENT DOCUMENTS

| | | | | |
|---|---|---|---|---|
| 4,580,162 A | * | 4/1986 | Mori | .................... 348/400.1 |
| 4,926,361 A | * | 5/1990 | Ohtsubo et al. | ............ 348/607 |
| 5,043,970 A | * | 8/1991 | Holman | ...................... 369/89 |
| 5,574,512 A | * | 11/1996 | Saeger | ........................ 348/620 |
| 6,094,233 A | * | 7/2000 | Miki et al. | .................. 348/624 |
| 6,343,097 B2 | * | 1/2002 | Kobayashi et al. | ......... 375/240 |
| 6,408,104 B1 | * | 6/2002 | Lim et al. | .................... 382/275 |
| 6,731,809 B1 | * | 5/2004 | Taniguchi et al. | .......... 382/236 |
| 2002/0118748 A1 | * | 8/2002 | Inomata et al. | ........ 375/240.04 |
| 2002/0126755 A1 | * | 9/2002 | Li et al. | ................. 375/240.12 |
| 2005/0135480 A1 | * | 6/2005 | Li et al. | ................. 375/240.12 |

FOREIGN PATENT DOCUMENTS

| | | |
|---|---|---|
| JP | 09-172637 | 6/1997 |
| JP | 10-108197 A | 4/1998 |
| JP | 2000-023165 A | 1/2000 |

* cited by examiner

*Primary Examiner*—Matthew C. Bella
*Assistant Examiner*—Ali Bayat
(74) *Attorney, Agent, or Firm*—Townsend and Townsend and Crew (57) ABSTRACT

An image recording device that compresses and records image data is provided wherein noise reduction is recursively performed on the non-compressed image signals and the feedback gain or the filtering characteristic of a recursive noise reduction circuit are controlled according to the compressibility of the image data in order to reduce the compressibility of the non-compressed image signals without deterioration or to improve the compressibility efficiency thereof and to reduce the digital value of the compressed image data with the frame noises in restraint.

11 Claims, 4 Drawing Sheets

IMAGE RECORDING DEVICE

BACKGROUND OF THE INVENTION

1. Technical Field of the Invention

The present invention relates to an image recording device that compresses and records the digitalized image signals.

2. Description of the Related Art

The digital value of the compressed data of the prior image recording device is normally restricted, which device digitalizes images and subjects the same images to compression coding for recording. For instance, as for a DVD-RAM recorder, the bit rate thereof is defined according to the recording speed, volume and the maximum recording time of the medium in use, which requires the digital value of the compressed images data to be restricted to a given value or below. Thus, when the digital value of the images data prior to compression is large such as high-precise and complicated images and the same value of the compressed images data goes beyond the definitive bit rate, it is controlled such that the compressibility of the subject data is enhanced so as to reduce the digital value of the compressed images data. However, the enhancement of such compressibility occurs block and mosquito noises and as such, which damages the quality of the images.

As an example of the prior art to restrain such noises caused by such high compression of the images data as mentioned above, it is disclosed in Japanese Patent Laid-open No. H9-172637 that when the compressibility of the images is high, the passing band of the images signals prior to compression is narrowed through a band restriction filter so as to belittle the digital value of the images signals prior to compression, which allows the compressibility thereof to be rendered lower so as to restrain the block and mosquito noises and as such.

In the above disclosure, the narrowing of the passing band of the low-pass filter leads to the lowering of the resolution of the images, in which there is likelihood to deteriorate the recorded signals prior to compression when the compressibility of the data is high.

The enhanced compressibility of the data and the increased digital value of the compressed data are caused by the complexity of the images themselves and another factors, one of which is a frame noise. The frame noise is not inherent in the images, but it increases the digital value of the images data in the same way as the complexity thereof. Further, the other factor is a lower correlation between frames. For example, in such compression technique as represented by MPEG2, in principles, the lower correlation between frames incapacitates the highly efficient compression of the data, which results in enlarging the compressibility thereof or increasing the digital value of the compressed images data. In the above prior reference, there is no disclosure to reduce the compressibility thereof or the digital value of the compressed data against the issues wherein the influence of the frame noises is enormous so as to worsen the S/N ratio and the correlation between the frames is low.

In view of the above unsolved prior issues, it is an object of the invention is to provide an image recording device that records the images with such frame noises as block and mosquito noises in restraint by lowering the compressibility of the digitalized signals or improving the compression efficiency thereof without deteriorating the signals prior to compression so as to reduce the digital value of the compressed images data.

SUMMARY OF THE INVENTION

That is, an image recording device according to the invention is basically characterized in that either one of a feedback gain of a differential signal generated from adjoining frames (or anterior and posterior frames in series) of the digitalized images signals prior to compression and a filtering characteristic output in response to the differential signal or both of them are controlled according to compressibility in a recursive noise reduction circuit so as to check the noise reduction effect and the correlation between the frames of the digitalized images signals in the same circuit. Concretely, the image recording device according to the invention is arranged such as (1) comprising a recursive noise reduction circuit referred to as numerals 12, 13, 14 and 15 in the embodiments as described below, which circuit provides the feedback gain to the differential signal generated between the anterior and posterior frames in series of the digitalized images signals prior to compression and adds the gained differential signal for its recurrence to the digitalized image signal input from an outside, and a control means referred to as numeral 3 in the embodiments as described below, which means checks the feedback gain according to compressibility wherein the controlled feedback gain checks the noise reduction effect and the correlation between the frames of the digitalized images signals prior to compression in the recursive noise reduction circuit so as to reduce the digital value of the compressed data; (2) comprising a recursive noise reduction circuit provided with a first means referred to as numerals 12, 13 and 14 in the embodiments as described below, which means generates a differential signal from the anterior and posterior frames in series of the digitalized images signals prior to compression and provides a feedback gain of the differential signal and a second means referred to as numeral 15 in the embodiments as described below, which means adds the gained differential signal to the digitalized image signal prior to compression input from an outside, and a control means referred to as numeral 3 in the embodiments as described below, which means checks the feedback gain according to compressibility wherein the controlled feedback gain checks the noise reduction effect and the correlation between the frames of the digitalized images signals in the same circuit so as to reduce the digital value of the compressed data; (3) comprising a recursive noise reduction circuit provided with a differential signal generation means referred to as numeral 12 in the embodiments, which means generates the differential signal from the anterior and posterior frames in series of the digitalized images signals prior to compression, a feedback gain generation means referred to as numeral 14 in the embodiments, which means generates the feedback gain of the differential signal and an addition means referred to as numeral 15 in the embodiments, which means adds the gained differential signal to the digitalized and non-compressed image signal input from the outside, and a compression recording means referred to as numeral 2 in the embodiments, which means compresses and records the digital value of a signal output from the addition means and a control means referred to as numeral 3 in the embodiments, which means checks the feedback gain generated by the generation means according to the compressibility of the compression recording means wherein the controlled feedback gain enhances the correlation between the frames of the digitalized images signals in the same circuit so as to reduce the compressibility thereof; (4) comprising a recursive noise reduction circuit provided with a differential signal generation means referred to as numeral 12 in the embodiments, which means generates the differential signal from the anterior and posterior frames in series of the digitalized and non-compressed images signals, a filter referred to as numeral 13 in the embodiments to which the differential signal is input and that outputs a signal in response to the correlative level between the frames according to the input differential signal, a feedback gain generation means referred to as numeral 14 in the embodiments, which means generates the feedback gain of the signal output from the filter and an addition means referred to as numeral 15 in the embodiments, which means adds the gained signal to the digitalized and non-compressed image signal input from the outside, and a compression recording means referred to as numeral 2 in the embodiments, which means compresses and records the digital value of the added signal output from the same circuit and a control means referred to as numerals 3, 3' and 3" in the embodiments, which means checks either one of the feedback gain and the filter characteristic of the same circuit or both of them wherein the control means checks the noise reduction effect and correlation between the frames of the digitalized and non-compressed images signals in the same circuit so as to lower the compressibility thereof or to reduce the digital value of the compressed data.

The above recursive noise reduction circuit performs the leveling-out of the frames in the time axis direction through the recursion of the differential signal to the non-compressed digitalized images signals input. The noises are of poor correlation so that during the leveling-out operation of the frames they are counterbalanced in the time axis direction thereof and reduced so as to improve the S/N ratio. On the other hand, during such operation, the correlation between the anterior and posterior frames of the images signals is high so as to enhance the correlative level of the respective frames without sacrificing the images signals. The enhancement of the correlative level of the respective frames leads to the reduction of the digital value of the non-compressed data so as to allow for the lower compressibility thereof, by the compression recording means. The higher the feedback gain in recursion is, the more the leveling-out of the frames is intensified so as to further improve the S/N ratio and to enhance the correlative level between the frames. There is tendency that the higher the compressibility thereof is, the further the image quality is deteriorated owing to the block and mosquito noises and as such. The deterioration of the image quality becomes conspicuous when the compressibility thereof goes beyond a given level. The controlling of the feedback gain and the filter characteristic in the recursive noise reduction circuit according to the correlation between the compressibility of the digitalized images signals and the block and mosquito noises allows the correlative level between the frames of non-compressed signals to change, which leads to a more efficient compression. Such efficient compression results in the restraint of the increased compressibility thereof and in the reduction of the digital value of the non-compressed signals due to the noise reduction effect.

DETAILED DESCRIPTION OF THE PREFERRED EMBODIMENT

Hereinafter, the preferred embodiments of the invention are described with reference to the accompanying drawings.

Figure 1:
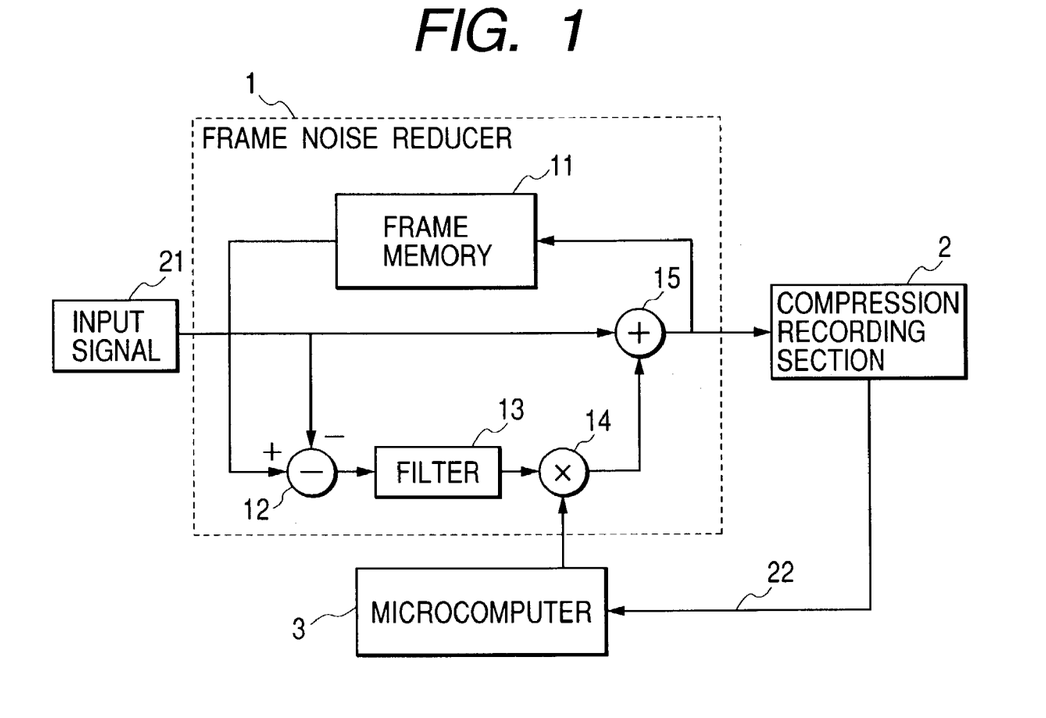
FIG. 1 is a view of the arrangement of an image recording device according to the first embodiment of the invention.
Figure 2:
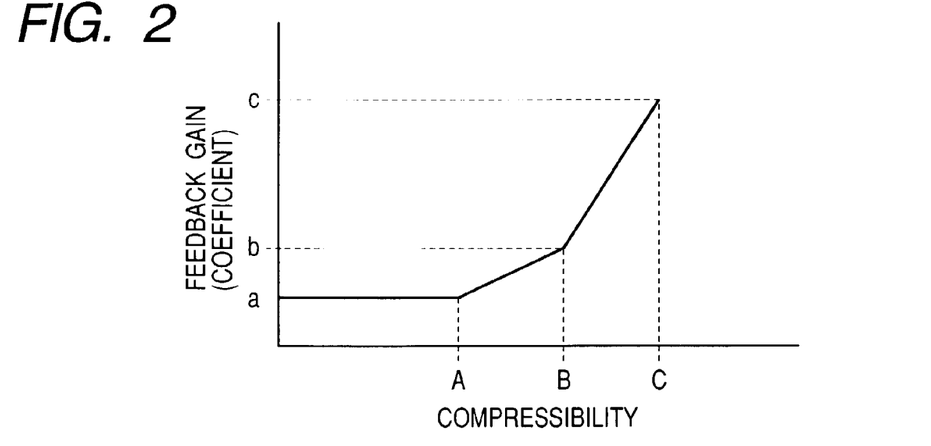
FIG. 2 is a view of the first controlling characteristic of the microcomputer as shown in FIG. 1.
Figure 3:
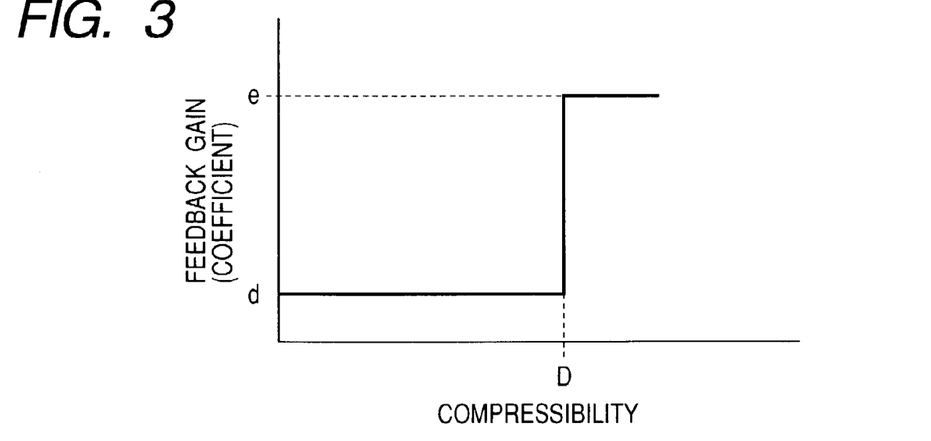
FIG. 3 is a view of the second controlling characteristic of the microcomputer as shown in FIG. 1.
Figure 4:
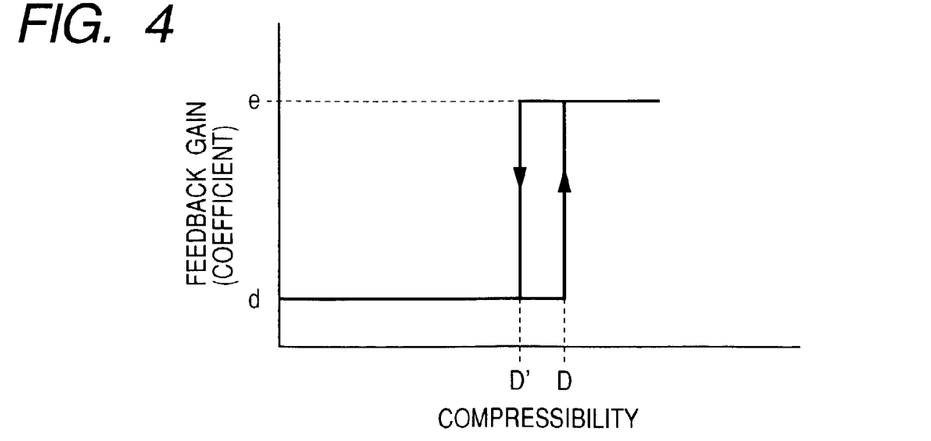
FIG. 4 is a view of the third controlling characteristic of the microcomputer as shown in FIG. 1.

FIGS. 1 through 4 are explanatory views of the first embodiment of the invention. FIG. 1 is a block diagram of an image recording device of the instant embodiment. FIGS. 2 through 4 are the first, second and third characteristics respectively of the control means as shown in FIG. 1.

The first embodiment of the invention is an example when the feedback gain is controlled in response to the compressibility of the digitalized images signals by means of the control means.

Reference numerals in FIG. 1 respectively indicate, 1 a frame noise reducer functioning as a so-called recursive noise reduction circuit, 2 a compression recording section functioning as a means to compress and record the digitalized images signals, 3 a microcomputer as the control means, 11 a frame memory to memorize the digitalized images signals, 12 a differential signal generation circuit as a means to generate a signal arranged with the difference (hereinafter, referred to as a differential signal) between the adjoining frames (or anterior an posterior frames in series) of the non-compressed digitalized images signals, 13 a filter subjecting the differential signal to filtering operation in response to the correlative level between the frames thereof, 14 a feedback gain generation circuit as a means to generate the feedback gain (or feedback coefficient) of the signal output from the filter, 15 an addition circuit as a means to add the gained signal at the circuit 14 to the non-compressed digitalized image signal input from an outside, 21 the input digitalized image signal and 22 a compressibility signal that the microcomputer 3 detects from the compression recording section 2. In the embodiment, the frame noise reducer 1 is constituted of the frame memory 11, the differential signal generation circuit 12, the filter 13, the feedback gain circuit 14 and the addition circuit 15. In this arrangement, the input digitalized image signal 21 is supplied to the compression recording section 2 through the addition circuit 15. The signal output from the addition circuit 15 is also supplied to the frame memory 11. The frame memory 11 delays the input signal by the time corresponding to one frame, which delayed signal is supplied to the differential signal generation circuit 12. The circuit 12 generates a differential signal from the difference between the input digitalized image signal 21 and the signal delayed by one frame and supplied from the frame memory 11, which differential signal is supplied to the filter 13. The filter 13 subjects the input differential signal to filtering operation. The signal output from the filter is provided with a feedback gain (feedback coefficient) at the circuit 14. The signal output from the circuit 14 is supplied (or fed back) to the addition circuit 15 so as to be added to the input digitalized image signal 21, which allows noise components to be reduced. To note, the feedback gain (feedback coefficient) generated at the circuit 14 denotes the feedback ratio of the differential signal. That is all for the operation of the frame noise reducer 1. The signal output from the addition circuit 15 is input to the compression recording section 2 so as to be compressed by a given compressibility, which compressed signal is recorded in the memory or other recording medium. The microcomputer 3 detects the current compressibility of the signal input to the section 2 so as to control the feedback gain (feedback coefficient) generated at the circuit 14.

FIG. 2 is the first controlling characteristic or programming feature of the microcomputer 3. In the drawing, the transversal axis indicates a compressibility whereas the vertical axis indicating a feedback gain value (or feedback coefficient value). The microcomputer is programmed such that the feedback gain value (or feedback coefficient value) changes according to the first range of compressibility A or below, the second range thereof ranging from A to B and the third range thereof ranging from B to C wherein it is arranged such that the feedback gain value (or feedback coefficient value) is the lowest of all at the first range thereof and increases according to the increment of the compressibility at the second and third ranges thereof. When the compressibility of the signals is within the first range, there is almost no case that the block and mosquito noises and as such occur. Thus, in this case, there is no need to further reduce the compressibility thereof and it is programmed that a lower feedback gain value (feedback coefficient value) a is generated at the feedback gain generation circuit 14. Where such lower feedback gain value (feedback coefficient value) a is programmed, the frame noise reducer 1 does not work actively for the improvement of the S/N ratio and the enhancement of the correlative level between the frames of the signal. Further, the lower compressibility thereof leads to the smaller decrease of the digital value of the compressed signals. When the compressibility thereof increases within the second range, the block and mosquito noises increase accordingly. Thus, it is programmed that the feedback gain value (feedback coefficient value) within the range from a to b is generated at the circuit 14, which allows the increased compressibility thereof to increment the feedback gain value (feedback coefficient value) accordingly. The frame noise reducer 1, upon the enhancement of the feedback gain or coefficient value, works to improve the S/N ratio of the signals prior to being input to the compression recording section 2 or the non-compressed signals and to enhance the correlative level of the frames thereof. Thus, the control programming of the microcomputer 3 such that the feedback gain or coefficient value generated at the circuit 14 is enhanced allows the data to be efficiently compressed with the improved S/N ratio thereof so as to reduce the digital value of the compressed data as well as the compressibility thereof. When the compressibility thereof is within the third range, in which it is further increased than the second stage, the block and mosquito noises are further intensified than at the second range. Therefore, at this range, it is programmed that the higher feedback gain or coefficient value within the range from b to c is generated at the circuit 14 so that it corresponds to the further increased compressibility than the second range. The frame noise reducer 1, upon the further enhancement of the feedback gain or coefficient value, has a recursive arrangement of further enhanced feedback gain than at the second range so as to work to improve the S/N ratio of the signals prior to being input to the compression recording section 2 or the compressed signals and to further enhance the correlative level of the frames thereof. Thus, at the third range too, the control programming of the microcomputer 3 such that the higher feedback gain or coefficient value is generated at the circuit 14 allows the data to be efficiently compressed with the improved S/N ratio thereof so as to reduce the digital value of the compressed data as well as the compressibility thereof. At the above second and third ranges, the enlarged inclination of the feedback gain or coefficient value against the compressibility facilitates the former to be enhanced according to the increased compressibility so as to reduce the digital value of the compressed signals as well as the compressibility thereof, but the leveling-out of the signals in the time axis direction where the correlative level of the frames is low easily causes the deterioration of the image quality such as bleeding. On the other hand, the smaller inclination of the feedback gain or coefficient value against the compressibility reduces the former value, which leads to the smaller reduction of the digital value of the compressed signals as well as the compressibility thereof. This facilitates the block and mosquito noises and as such to occur. Accordingly, due care shall be taken against those points for programming the microcomputer 3 as to the inclination of the feedback gain or coefficient value against the compressibility, which points are well coped with by the controlling characteristic shown in FIG. 2. In the controlling characteristic of FIG. 2, it is shown that the relation between the compressibility and the feedback gain or coefficient value is linearly expressed at the respective first, second and third ranges, but it may be curvedly expressed. This may lead to the further improved quality of the compressed images with higher precision.

FIG. 3 shows the second controlling characteristic programmed in the microcomputer 3 of the first embodiment shown in FIG. 1. It is characterized that the feedback gain or coefficient value changes in binary scale against the compressibility and the former changes from d to e when the latter amounts to D or more. According to the change scale (e-d) of the feedback gain or coefficient value, the frame noise reducer 1 works to enhance the noise reduction effect and the correlative level between the frames so as to reduce the digital value of the compressed signals as well as the compressibility thereof. According to the instant characteristic, even when the compressibility by nature goes beyond D, it can be restrained to D or less. Also, for instance, when the block and mosquito noises and as such increase remarkably at the compressibility of D or more, the interaction of the frame noise reducer 1 reduces the same below D so as to restrain those noises from occurring. Then, when the compressibility amounts to D or less, the feedback gain or coefficient value changes from e to d, so that the same value is normally set at e to lower the compressibility. When the value d amounts to 0 upon the lowering of the compressibility, the frame noise reducer 1 may be switched off. When the reducer is off, the frame memory 11 may be powered off so as to reduce the power consumption of the device at the lowest compressibility of all.

FIG. 4 shows the third controlling characteristic programmed in the microcomputer 3 according to the first embodiment of the invention. In this characteristic, the feedback gain or coefficient value changes in binary scale and with hysteresis against the compressibility so that the same value differs in the increased and decreased compressibility. Namely, it is arranged such that the same value changes from d to e at D when it increases while changing from e to d at D' lower than D when it decreases, which prevents the malfunctioning of the switching operation of the same value.

According to the first embodiment of the invention, the feedback gain or coefficient value generated at the circuit 14 is increased by the microcomputer 3 according to the scale of compressibility, and the S/N ratio of the non-compressed signals without deterioration and the correlative level between the frames are improved. Thus, the signals is efficiently compressed with the improved S/N ratio. The compressibility is restrained to a lower level without unnecessarily increasing the feedback gain or coefficient value, and the digital value of the compressed data and the compressibility thereof are reduced. The block and mosquito noises and are subdued to improve the image quality.

Figure 5:
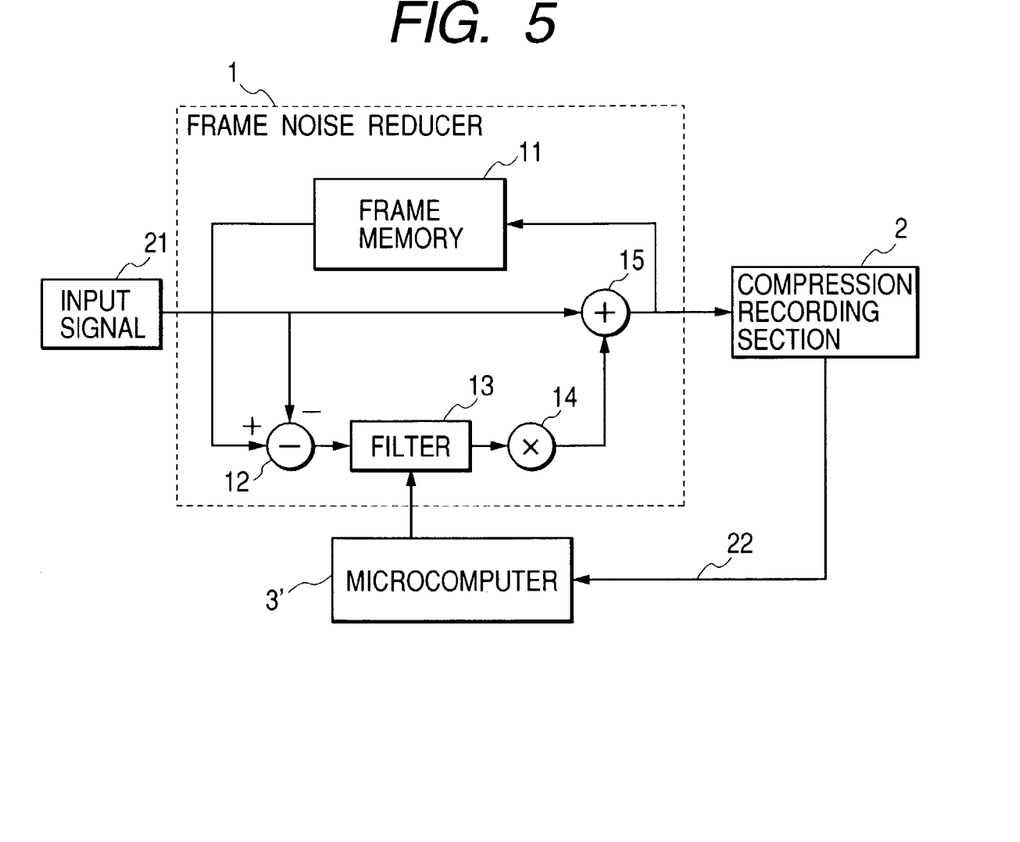
FIG. 5 is a view to show the arrangement of an image recording device according to the second embodiment of the invention.
Figure 6:
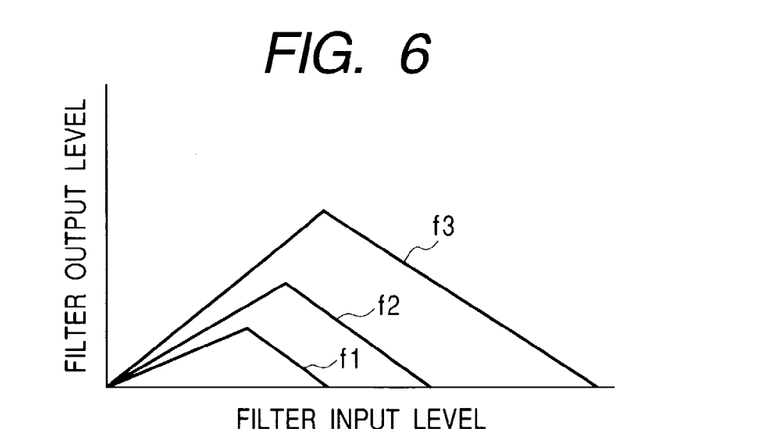
FIG. 6 is a view of an example of the controlling characteristic of the microcomputer as shown in FIG. 5.

FIGS. 5 and 6 are explanatory views of the second embodiment of the invention. FIG. 5 is a block diagram of an image recording device, and FIG. 6 shows the controlling characteristic of the control means of FIG. 5.

The second embodiment is an example when the filtering characteristic of the recursive noise reduction circuit is checked by the control means according to the compressibility of the signals.

In FIG. 5, reference numeral 3' indicates a microcomputer adopted for the control means. The microcomputer 3' detects a compressibility signal 22 from the compression recording section 2 and checks the filtering characteristic of a filter 13 incorporated in the frame noise reducer 1 adopted for the recursive noise reduction circuit. The differential signal output from the differential signal generation circuit 12 adopted for the differential signal generation means is input to the filter 13, which filter performs the filtering operation on the differential signal in response to the correlative level between the frames thereof. The other basic structural elements of the device are substantially the same as those shown in FIG. 1. The signal output from the filter is provided with a feedback gain or coefficient at the feedback gain generation circuit 14, the signal output from which circuit is supplied (fed back) to the addition circuit 15 and added to the digitalized image signal 21 as input from the outside. This subdues the noise components. The signal output from the addition circuit 15 is input to the compression recording section 2 so as to be compressed with a given compressibility and recorded in the memory or other appropriate recording medium.

FIG. 6 shows the characteristic programmed in the microcomputer 3' shown in FIG. 5 for controlling the filter 13. In the drawing, the transversal axis indicates an input level of the filter 13 while the vertical axis indicating an output level thereof. The difference between the input digitalized image signal 21 and the signal delayed by one frame and input from the frame memory 11 is input to the filter 13 wherein a portion of the signal with a higher correlative level between the frames in series is small in such difference so that the input level of the filter becomes lower and on the other hand that with a lower correlative level therebetween is large in such difference so that the input level thereof becomes higher. In the instant embodiment, the range of compressibility is divided into three levels, to which respective levels the f1, f2 and f3 of the input-output level correspond. The switchover of the input-output level is executed by the microcomputer 3. The input-output level f1 is used when the detected compressibility is lower or where the block and mosquito noises are hard to occur. The input-output level f3 is used when the detected compressibility is higher or where those noises are easy to occur. The input-output level f2 is applied in the intermediary situation between the levels f1 and f2. To begin with, the effect of the filter 13 is described with reference to the level f1 among others. The characteristic portion thereof with an upward inclination to the right side of FIG. 6 shows where the input level to the filter 13 is lower or where a portion of the signal with a higher correlative level between the frames in series and with the scarcity of such difference passes through the filter, in which the input-output characteristic of the f1 level linearly changes. This allows the noise reduction effect to be obtained according to the input level to the filter. Then, the characteristic portion thereof with a downward inclination to the right side of FIG. 6 shows where the input level to the filter 13 is higher or where a portion of the signal with a lower correlative level between the frames in series and with the largeness of such difference passes through the filter, in which it is arranged such that the higher the input level to the filter becomes, the lower the output level therefrom becomes. In other words, the lower the correlative level between the frames in series becomes, the harder the signal becomes to pass through the filter so as to restrain the leveling-out of the signal in the time axis direction through the recursion thereof. Where the input level to the filter 13 is far higher or where a portion of the signal with a far lower correlative level between the frames in series passes through the filter, the output level thereof becomes 0 in which the feedback gain is not provided to the output signal.

Then, the reduction of the digital value of the compressed data and the compressibility thereof according to the transitional change of the respective input-output levels f1 to f3 is described below. The input-output level f1 of the filter is the hardest of all to pass the feedback signal through, in which noise reduction effect is not brought more than required. On the other hand, the input-output level f3 thereof is the easiest of all to pass the same through, in which it is arranged so that the output level from the filter against the input level thereto changes more drastically than the input-output level f1. Thus, the noise reduction effect brought by the frame noise reducer 1 at the input-output level f3 is larger than at the input-output level f1 in that it improves the S/N ratio of a portion of the signal with a lower correlative level between the frames in series (or a portion of the signal larger in difference between the anterior and posterior image levels) and enhances the correlative level therebetween so as to effectively reduce the digital value of the compressed data and the compressibility thereof. This allows the block and mosquito noises to be further restrained. FIG. 6 shows an example in which the compressibility is divided into three levels, to which example the instant embodiment is not limited, but it may be divided into other than three levels.

The instant embodiment also improves the S/N ratio of the non-compressed signal without deterioration and enhances the correlative level between the frames in series. This allows the data to be efficiently compressed with the S/N ratio thereof improved and to restrain the compressibility thereof to a lower level without unnecessarily increasing the feedback gain (or coefficient) value so as to reduce the digital value of the compressed data and the compressibility thereof. The block and mosquito noises are subdued on the frames, which improves the image quality. The bleeding of the images caused at a portion of the signal with a lower correlative level between the frames is restrained by the filter characteristic with a downward inclination to the right side of FIG. 6.

Figure 7:
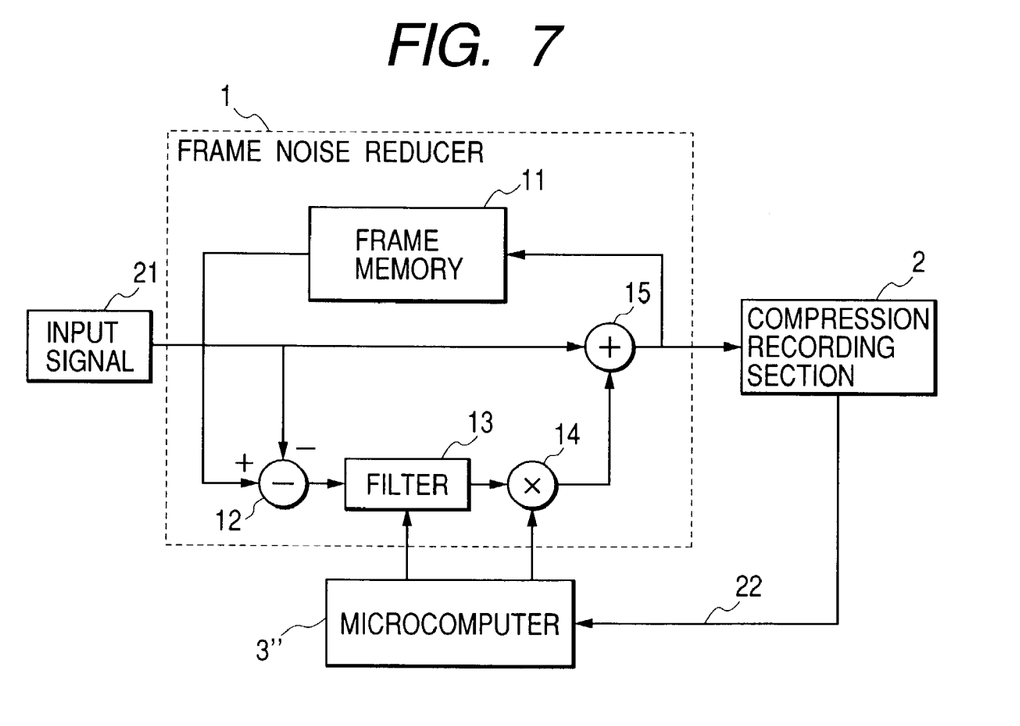
FIG. 7 is a view to show the third embodiment of the invention.

FIG. 7 is an explanatory view of the third embodiment of the invention.

The instant embodiment is arranged so that the feedback gain (or coefficient) generated at the feedback gain generation means of the recursive noise reduction circuit and the filtering characteristic of the filter thereof are alternatively or simultaneously controllable by means of the control means in response to the compressibility of the input signal.

In FIG. 7, reference numeral 3″ indicates a microcomputer adopted for the control means. The microcomputer 3″ detects a compressibility signal 22 from a compression recording section 2 and accordingly controls the feedback gain (or coefficient) generated at the circuit 14 of the frame noise reducer 1 adopted as the recursive noise reduction circuit and the filtering characteristic of the filter 13 thereof.

The arrangement and operation for controlling the feedback gain (or coefficient) are the same as described in the first embodiment, and those for controlling the filtering characteristic are the same as described in the second embodiment. In this arrangement, the microcomputer 3″ may simultaneously or alternatively execute controlling the feedback gain (or coefficient) and the filtering characteristic.

The instant embodiment allows the bleeding of images caused at a portion of the signal with a lower correlative level between the frames to be restrained by the filtering characteristic with downward inclinations to the right side of FIG. 6 so as to further enhance the feedback gain (or coefficient) than the case where there is provided no filter in the device and to further reduce the digital value of the compressed data as well as the compressibility thereof. Further, the frame noise reducer 1 may play its role by selecting the feedback gain (or coefficient) control basis or the filtering characteristic control basis according to the correlative level between the frames. The other effects brought by the instant embodiment are the same as described in the first and second embodiments.

In the above embodiments, it is described that the microcomputers 3, 3′ and 3″ detect the compressibility of the signal at the compression recording section 2 and controls the feedback gain (or coefficient) or the filtering characteristic, which compressibility it is arranged so that may be controlled by those microcomputers.

The image recording device according to the invention allows the compressibility of the non-compressed signals to be lowered or the compression efficiency thereof to improve without deterioration, which results in reducing the digital value of the compressed data with the frame noises such as block and mosquito noises in restraint.

The invention may be carried out with other modes than the above embodiments without deviating from the spirits and the main features thereof. Accordingly, it is appreciated that the above embodiments are just a few examples among others, to which the invention is not restricted. The technical scope of the invention is indicated by the accompanying patent claims. Furthermore, all the equivalent changes and modifications to the attached patent claims also belong to the technical scope of the invention.

What is claimed is:

1. An image processing device for a digitalized image signal comprising:
   a recursive noise reducer which provides a feedback gain to a difference between successive frames of said digitalized image signal to produce an adjusted differential signal, and adds said adjusted differential signal to said digitalized image signal inputted from outside so as to reduce noises; and
   a control means which controls said feedback gain according to a compressibility for said digitized image signal outputted.

2. The image processing device according to claim 1, wherein said control means is arranged so that said control means increases said feedback gain of said recursive noise reducer when said compressibility exceeds a set value.

3. The image processing device according to claim 1, wherein said control means is arranged so that said control means decreases said feedback gain of said recursive noise reducer when said compressibility is not more than a set value.

4. An image processing device for a digitalized image signal comprising:
   a recursive noise reducer comprising a differential signal generation means to generate a differential signal from successive frames of said digitalized image signal, a feedback gain generation means to provide a feedback gain to said differential signal to produce an adjusted differential signal, and an addition means to add said adjusted differential signal to said digitalized image signal inputted from outside;
   a compression recording means which compresses and records an output signal outputted from said addition means; and
   a control means which controls the feedback gain of said feedback gain generation means according to a compressibility of said compression recording means.

5. The image processing device according to claim 4, wherein said control means is arranged so that said control means increases said feedback gain of said recursive noise reducer when said compressibility exceeds a set value.

6. The image processing device according to claim 4, wherein said control means is arranged so that said control means decreases said feedback gain of said recursive noise reducer when said compressibility is not more than a set value.

7. An image processing device for a digitalized image signal comprising:
   a recursive noise reducer comprising a differential signal generation means to generate a differential signal from successive frames of said digitalized image signal, a filter which inputs said differential signal and outputs a signal in response to a correlative level between said frames of said differential signal, a feedback gain generation means to provide a feedback gain to said signal outputted from said filter to produce an adjusted differential signal, and an addition means to add said adjusted differential signal to said digitalized image signal inputted from outside;
   a compression recording means which compresses and records the digitized image signal which is outputted by the addition means; and
   a control means to check any one or both of said feedback gain and a characteristic of said filter in said recursive noise reducer according to a compressibility of said compression recording means.

8. The image processing device according to claim 7, wherein said control means is arranged so that said control means increases said feedback gain of said recursive noise reducer when said compressibility exceeds a set value.

9. The image processing device according to claim 7, wherein said control means is arranged so that said control means decreases said feedback gain of said recursive noise reducer when said compressibility is not more than a set value.

10. An image processing device for a digitalized image signal comprising:
    a recursive noise reducer which applies a feedback gain to a difference between sequential frames of the digitalized image signal, comprising a frame from the digitalized image signal and a frame delayed by time corresponding to one frame, to produce a gain adjusted difference, and adds the gain adjusted difference to the digitalized image signal inputted from outside; and a compressor which compresses the digitalized image signal outputted by the recursive noise reducer.

11. The image processing device of claim 10 wherein the compressor is configured to generate the feedback gain in response to the digitalized image signal outputted by the recursive noise reducer.

* * * * *